United States Patent
Royo Royo et al.

(10) Patent No.: US 9,300,851 B2
(45) Date of Patent: Mar. 29, 2016

(54) METHOD AND SYSTEM FOR COMPENSATING OPTICAL ABERRATIONS IN A TELESCOPE

(75) Inventors: Santiago Royo Royo, Barcelona (ES); Vincent Suc, Region Metropolitana (CL)

(73) Assignees: UNIVERSITA POLITECNICA DE CATALUNYA, Barcelona (ES); PONTIFICIA UNIVERSIDAD CATOLICA DE CHILE, Region Metropolitana (CL)

(*) Notice: Subject to any disclaimer, the term of this patent is extended or adjusted under 35 U.S.C. 154(b) by 372 days.

(21) Appl. No.: 13/813,408

(22) PCT Filed: Jul. 22, 2011

(86) PCT No.: PCT/ES2011/070541
§ 371 (c)(1),
(2), (4) Date: Jul. 3, 2013

(87) PCT Pub. No.: WO2012/025648
PCT Pub. Date: Mar. 1, 2012

(65) Prior Publication Data
US 2013/0278763 A1    Oct. 24, 2013

(30) Foreign Application Priority Data
Jul. 30, 2010   (ES) .................................. 201001030

(51) Int. Cl.
*H04N 7/18*   (2006.01)
*H04N 5/228*  (2006.01)
(Continued)

(52) U.S. Cl.
CPC ............... *H04N 5/232* (2013.01); *G02B 23/06* (2013.01); *G02B 27/0025* (2013.01)

(58) Field of Classification Search
USPC ............. 348/125, 208.12, 345; 359/744, 366, 359/362, 728, 726
See application file for complete search history.

(56) References Cited

U.S. PATENT DOCUMENTS

| | | | |
|---|---|---|---|
| 7,130,127 B2* | 10/2006 | Niino et al. | ........... 359/637 |
| 2004/0233525 A1 | 11/2004 | Niino et al. | |
| 2007/0229993 A1 | 10/2007 | Hemmati et al. | |

FOREIGN PATENT DOCUMENTS

| | | |
|---|---|---|
| EP | 0 252 034 | 1/1988 |
| EP | 1 208 402 | 12/2006 |

(Continued)

OTHER PUBLICATIONS

A Passive Auto-Focus Camera Control System, Chen et al, Aug. 2009.*
International Search Report for International Application No. PCT/ES2011/070541 mailed Feb. 2, 2012.

*Primary Examiner* — Daquan Zhao
(74) *Attorney, Agent, or Firm* — Merchant & Gould P.C.

(57) ABSTRACT

A method and a system are for compensating optical aberrations in a telescope. The method is applicable to a telescope wherein the element for receiving a primary beam is an image acquisition device (3), and involves using an algorithm without an image processing sensor for: a) detecting optical aberrations affecting the primary focus, by analyzing the images acquired by the image acquisition device (3), and b) calculating and generating first positional correction values, by processing the detected optical aberration values. The method also includes a step c) consisting in moving, in a controlled manner, the image acquisition device (3), applying suitable control signals generated from the first positional correction values. The system is suitable for implementing the proposed method.

27 Claims, 3 Drawing Sheets

(51) Int. Cl.
*H04N 5/232* (2006.01)
*G02B 23/06* (2006.01)
*G02B 27/00* (2006.01)
*G03B 13/00* (2006.01)
*G02B 23/24* (2006.01)
*G02B 23/00* (2006.01)
*G02B 17/00* (2006.01)
*G02B 21/00* (2006.01)

(56) References Cited

FOREIGN PATENT DOCUMENTS

| | | |
|---|---|---|
| WO | WO 01/65297 | 9/2001 |
| WO | WO 2005/026780 | 3/2005 |
| WO | WO 2006/127986 | 11/2006 |
| WO | WO 2007/115357 | 10/2007 |
| WO | WO 2009/120847 | 10/2009 |

\* cited by examiner

METHOD AND SYSTEM FOR COMPENSATING OPTICAL ABERRATIONS IN A TELESCOPE

This application is a National Stage Application of PCT/ES2011/070541, filed 22 Jul. 2011, which claims benefit of Serial No. P201001030, filed 30 Jul. 2010 in Spain and which applications are incorporated herein by reference. To the extent appropriate, a claim of priority is made to each of the above disclosed applications.

BACKGROUND

The present invention concerns, in a first aspect, a method for compensating optical aberrations in a telescope, and more particularly, a method that comprises carrying out said compensation of optical aberrations by moving, in a controlled manner, an image acquisition device.

A second aspect of the invention concerns a system capable of implementing the method proposed by the first aspect.

There are systems applied to different classes of telescopes, both professional and amateur, for compensating different kinds of aberrations, in some cases caused by mechanical flexures, and in others by different types of optical aberrations, in general low-order aberrations.

To date, some systems used by professional astronomical observatories have been adapted and democratized for smaller, amateur-type telescopes. The following are some examples of said adaptations:

"Bisque software": proposes the implementation of a "tpoint" model in the interface of its control systems via the "thesky" software. The "tpoint" allows modeling the aberrations of mechanical flexures and correct the position of the mount by means of an "offset", depending on the previous result. This system allows modeling and correcting the pointing of the telescope without taking into account or correcting the optical aberrations included by the flexure of the telescope. It also fails to allow adjusting or acting on the optical alignment of the telescope.

"Maxim": proposes a system similar to the "bisque software" based on more simplified equations, but also limited to mechanical modeling only.

"Meade": in its more advanced telescope models it proposes an electronic collimation system that allows moving one of the mirrors along two axes to ensure the alignment in the center of the sensor. This function does not ensure the correct centering or the correct alignment of the optics in the entire sensor.

At a professional level, there are large-scale aberration compensation systems that are very complex due to the size of the instruments wherein they must be applied.

This is the case of the "Magellan" telescopes (6 m in diameter), wherein there is a positioning system to position the secondary mirror of the telescope, composed by four supporting points, which requires the use of eight actuators, implying a complex mechanical design that is undesirable to be extrapolated to the design of smaller telescopes (for example, 50 cm to 1 m in diameter).

The majority of large telescopes correct optical alignment aberrations by means of what is known as "wavefront sensing" with the use, in general, of a "Shack Hartmann" sensor. The foregoing allows correcting several optical modes, where the correction is carried out by means of actuators below the mirror but involves having a costly system, which is not of interest to be implemented in small telescopes due to the loss of light energy entailed by an additional sensor in a telescope with a small diameter.

Different patent documents describing more or less complex optical aberration compensation proposals in telescopes are cited below.

Application EP0252034A2 describes a method for correcting, through electronic means, the curvature defects in the captured images, which is applicable to mirror telescopes with large diameters. The method is based on the adjustment of the curvature of the primary mirror, which is partially elastic, by means of the adjustment of the pressure of a gas in contact with one of its faces, under the control of an electronic system in collaboration with temperature and pressure-detecting devices, and optionally, with monitoring laser systems of the curvature of the primary mirror.

Patent EP1208402B1 proposes a semi-active thermal compensation and focusing system of a three-mirror anastigmat reflective telescope, centrally obscured, where the secondary mirror is mounted on a structure formed by thermally deformable support struts. The system comprises a series of temperature sensors arranged in the support struts, and optionally in the secondary mirror, and is envisaged for, depending on the detected temperatures, controlling the heating elements to selectively heat the struts to control the position of the secondary mirror in relation to the primary mirror, and optionally, also to control the secondary mirror to modify its curvature. This way, the relative curvatures between the secondary and primary mirrors, as well as the separation between them, are kept substantially constant, with the purpose of maintaining the telescope correctly focused.

EP1208402B1 does not indicate the possibility of controlling the position of an optical element other than the aforementioned secondary mirror, or of correcting any other type of aberrations other than those relative to defocus.

The following two records contemplate the possibility of analyzing the images acquired by an image acquisition device to detect optical aberrations and act on a mobile optical element of the telescope, with the purpose of correcting said optical aberrations.

International application WO2006127986 describes an apparatus and methods for the focusing and collimation of telescopes by means of an electronic control unit which, depending on the information referring to the optical elements, or other types of elements, of the telescope, referring to a user or a scanning or image acquisition device, controls, in general, a lens of the telescope, adjusting its position with the purpose of correcting the focus and/or collimation of the telescope.

According to an embodiment example of WO2006127986, the information on which the aforementioned control unit is based is the information included in an image captured by a camera, which is processed to determine whether the telescope is focused or collimated correctly, and to determine the appropriate adjustments relative to the orientation and/or position of the secondary mirror of the telescope to compensate the possible focus and collimation errors by acting on said secondary mirror.

WO2006127986 does not indicate or suggest acting on elements of the telescope other than the lens or the aforementioned secondary mirror, or correcting aberrations other than those relative to defocus and collimation.

U.S. Pat. No. 7,130,127B2 proposes a terrestrial telescope with a digital camera that includes a group of mobile focus lenses according to an optical axis and an image acquisition device arranged to receive the light traversing said lenses and a light reflection/transmission element arranged between both of them.

An embodiment example of U.S. Pat. No. 7,130,127B2 proposes processing the images acquired by the image acquisition device with several purposes, including correcting the generated focus and applying the corresponding control signals to the group of mobile lenses to move them along the aforementioned optical axis.

U.S. Pat. No. 7,130,127B2 also fails to indicate the possibility of correcting the position of an optical element other than the aforementioned group of lenses or correcting aberrations other than the aberrations relative to defocus.

It seems that it is necessary to offer an alternative to the state of the art that fills the gaps found therein, in particular those referring to the absence of proposals related to the compensation of optical aberrations by means of the displacement of an image acquisition device of a telescope, which may be used to detect said optical aberrations as well.

SUMMARY

The current invention constitutes said alternative to the state of the art, for which it concerns, in a first aspect, a method for compensating optical aberrations in a telescope, which comprises carrying out the following steps in an automatic manner:

a) detecting optical aberrations affecting the primary focus, by analyzing the images acquired by an image acquisition device, such as a camera;

b) calculating, based on said optical aberrations detected in a), with the purpose of compensating the same, first positional correction values, and c) moving, in a controlled manner, at least one element for receiving a primary beam after being reflected by a primary mirror or refracted by a focus lens of said telescope, depending on whether it is a reflective or refractive telescope, by applying suitable control signals generated from said first positional correction values.

Unlike the conventional proposals, the method proposed by the first aspect of the invention is applied to a telescope where the element for receiving a primary beam, to be moved in c), is said image acquisition device, and because it comprises using an algorithm without an image processing sensor to carry out said step a) by means of said analysis of one or more images acquired by said image acquisition device, and to carry out said step b) by means of the processing of the values of the detected optical aberrations and the generation of said first positional correction values as a result of said processing.

For an embodiment example, the method comprises moving said image acquisition device by moving a support thereof according to different degrees of freedom.

An algorithm without a sensor must be understood as the algorithm that is capable of detecting the optical aberrations by only using the images captured by the image acquisition device, without using any additional sensors.

In an example of a preferred embodiment, said algorithm without a sensor is a sensorless adaptive optics algorithm, or SAO.

Regarding the aberrations to be compensated, these are, according to a preferred embodiment example, low-order optical aberrations, including one or more of the following low-order optical aberrations: defocus, distortion, tilt, coma, or a combination thereof.

Even though it is possible to carry out the aforementioned steps in real time for an embodiment example, that is to say, in a closed loop, detecting optical aberrations and generating and applying the corresponding positional correction values, said embodiment example is not very efficient, especially taking into account the response time required to carry out all of the steps prior to obtaining images that are substantially free from optical aberrations.

For this reason, for other more preferred embodiment examples, the method comprises carrying out the compensation of optical aberrations by operating in an open loop fully or in part during extended periods of time, measuring the wave front for different positions at a certain moment and applying some or all the steps of the method to said measures as part of a calibration process.

In an embodiment example for which the method comprises carrying out the compensation of optical aberrations by operating in an open loop only in part, the method comprises, in order to carry out said calibration process, carrying out a plurality of steps a) for a corresponding plurality of positions of the telescope, correlating the data of the detected optical aberrations with the data of the telescope positions for which they were detected, and recording said correlations in an aberration correction registry.

For said case of a partial operation in an open loop, the method comprises orienting the telescope towards determined coordinates, consulting said aberration correction registry to look for the data of the telescope position after being oriented in that manner and the correlated data of the detected optical aberrations, and moving, in step c), the image acquisition device depending on the optical aberration data obtained as a result of said consultation of the aberration correction registry after processing the values of the optical aberrations extracted from the registry, and the corresponding generation and application of the first positional correction values.

For an embodiment example for which the method comprises carrying out the compensation of optical aberrations by operating fully in an open loop, the aforementioned calibration method also comprises carrying out a plurality of steps b) for said plurality of telescope positions and correlating the data of the calculated first positional correction values with the data relative to the detected optical aberrations and with the data of the corresponding telescope positions, and including the data of the first positional correction values in the aberration correction registry.

For said case of a full operation in an open loop, the method comprises orienting the telescope towards determined coordinates, consulting said aberration correction registry to look for the data of the telescope position after being oriented in that manner and the correlated data of the detected optical aberrations, and moving, in step c), the image acquisition device according to the data of the first positional correction values extracted from the aberration correction registry.

The method comprises, with the purpose of establishing the orientation of the telescope towards said determined coordinates, correcting positioning errors regarding its mounting system, detecting, as a minimum, the values of said positioning errors directly and/or indirectly, and using a pointing algorithm to process said values as supplying, as a result of said processing, second positional correction values, in this case relative to the position of the telescope.

According to an embodiment example, the method comprises carrying out said correction of positioning errors by also detecting values of one or more non-positional parameters that have an influence on the generation of said positioning errors, and using said pointing algorithm to also process the values of said non-positional parameters.

With the purpose of likewise working in an open loop to carry out the aforementioned telescope positioning, the method comprises, for an embodiment example, carrying out a training process consisting in detecting the value of said positioning errors (for example, by means of position detectors or "encoders") for a plurality of telescope positions, in relation to its mounting system, detecting and/or calculating values of said non-positional parameters for at least each one of said plurality of telescope positions and/or for different working temperatures to which the telescope is submitted, and using the pointing algorithm to process all of said values, supplying and correlating the corresponding second positional correction values with the values of the positioning errors and the non-positional parameters, and recording said correlations in a pointing registry, in order to obtain the values to be applied to orient, in a precise manner, the telescope towards determined coordinates, that is to say, the second positional correction values, by simply consulting said pointing registry.

The aforementioned non-positional parameters are, according to an embodiment example, one or more parameters of the group that includes the following non-positional parameters: expansion coefficients due to temperature, flexure of the support of a mirror, flexure of a support of an image capture device, flexure of the tube of the telescope, flexure of the mounting system or mount of the telescope, or a combination thereof.

The aforementioned positioning errors refer to one or more of the following positional parameters relative to the mounting system of the telescope: delta displacement parameter and alpha displacement parameter of the reference of each axis, delta non-perpendicularity parameter and alpha non-perpendicularity parameter of the axes, horizontal alignment error parameter and vertical alignment error parameter to the pole, for an equatorial mounting system or mount, or to the zenith point, for an alt-azimuth mounting system or mount, or a combination thereof.

In addition to the six aforementioned positional parameters, depending on the shape of the remainder obtained with said six parameters, the method comprises using, for embodiment examples, more or less additional positional parameters, such as the parameters relative to the modeling of the flexures of the tube or the mount, each parameter being able to represent a flexure, part thereof or several joint flexures, or of any other cause that has an influence on the generation of the aforementioned positioning errors.

Said parameters are factors that are arranged in front of a function, such as a sinusoid, a polynomial, an absolute value, a linear regression, etc., depending on how the remainders are interpreted, and the number and type of parameters and functions to be used depends on the embodiment example.

According to an embodiment example, the method comprises, from among said non-positional parameter or parameters that have an influence on the generation of said positioning errors, supplying the values of the non-positional parameter or parameters, which also have an influence on the optical system of the telescope to the sensorless algorithm, and processing them by means of the sensorless algorithm, along with the values of the detected optical aberrations to calculate, in step b), the first positional correction values to therefore compensate the negative effects that said non-positional parameters could have on the optical system.

With the purpose of being able to work in an open loop, also regarding the first positional correction values calculated by taking into account the aforementioned non-positional parameters according to an embodiment example of the method proposed by the present invention, the aforementioned calibration process also comprises at least detecting and/or calculating the values of said non-positional parameters for at least each one of said plurality of telescope positions and/or for different working temperatures to which the telescope is submitted, and including said detected values in said aberration control registry, as well as using them for the calculation, in said plurality of steps b), of said data of the first positional correction values and including them in the aberration correction registry, also correlated with the values detected and/or calculated of said non-positional parameters.

By means of the correction registry obtained in this manner, the full operation in an open loop is made possible for an embodiment example that uses an aberration correction registry that is more complete than the one used for the embodiment example explained previously, also referring to the full operation in an open loop, and for which the method comprises orienting the telescope towards determined coordinates, consulting said aberration correction registry to look for the data of the telescope position after being oriented in that manner, the values of the detected and/or calculated non-positional parameters and the correlated data of the detected optical aberrations, and moving, in step c), the image acquisition device according to the data of the first positional correction values consulted in said aberration correction registry.

The present specification refers to the non-positional parameters, and in particular obtaining said non-positional parameters, indicating that they may have been detected and/or calculated. This is so due to the very varied nature thereof, obtaining the values of some of them by means of the use of detection devices, those relative to flexure, for example, by means of the use of strain gauges, and others by means of making a series of calculations, such as, for example, the expansion coefficient due to temperature by means of calculations applied to data obtained by one or more temperature sensors.

With the purpose of understanding the integration in the operation of a telescope of the different corrections explained up to this point, an embodiment example is exposed below, for which the method comprises, with the purpose of obtaining, with respect to a region of space located within determined coordinates, images that are substantially free from the influence of optical aberrations and positioning errors, by carrying out the following actions:

detecting, for the position of the mirror with respect to its mounting system, corresponding to said coordinates, the values of the positioning errors and the working temperature and detecting and/or calculating the values of said non-positional parameters corresponding to said position and working temperature;

consulting the values of the positioning errors detected and the values detected and/or calculated of the non-positional parameters in said pointing registry, obtaining the correlated second positional correction values and using them to orient the telescope towards said coordinates in a precise manner;

consulting said aberration correction registry to look for the first positional correction values correlated with the data of the position of the telescope corresponding to said coordinates and with the values of said detected and/or calculated non-positional parameters, and     moving, in step c), the image acquisition device according to the data of the first positional correction values obtained in said consultation of the aberration correction registry.

The consultation of the pointing and aberration correction registries, and the subsequent use of the correction values extracted thereof, are carried out in a sequential manner, in any order, or in a simultaneous manner, depending on the embodiment example.

In another embodiment example of the method proposed by the present invention, said step b) also comprises calculating, based on at least the optical aberrations detected in a), with the purpose of compensating them, third positional correction values for an element for receiving a beam reflected by a secondary mirror of the telescope, and step c) also comprises moving said element for receiving said beam reflected by said secondary mirror and/or moving the secondary mirror by means of the application of suitable signals generated based on the third positional correction values.

By using the algorithm without an image processing sensor, and in particular the SAO algorithm by means of the method proposed by the invention, it should be taken into account that the images acquired by the camera contain shadows caused by the camera itself, in the case of a primary focus configuration, or of other elements, such as mirrors, as is the case of telescopes with "Cassegrain" or "Nasmyth" configurations. Said shadows manifest in a series of changes in the frequency spectrum of the images with respect to the images that would be captured in the case of the absence of said shadows. This is why the method comprises using the sensorless algorithm by adjusting the width of the frequency spectrum to be analyzed and processed in order to limit the effects related to the shadows due to the obstructions that appear in the image or images caused by the interposition of the image acquisition device and/or of another element between the incident light and the primary mirror.

In general, said frequency spectrum to be analyzed and processed by the sensorless algorithm is between 0.5 and 20% of the total frequency spectrum of the acquired images.

A second aspect of the invention concerns a system for compensating optical aberrations in a telescope, where said telescope comprises, as a minimum, an element for receiving a primary beam after being reflected by a primary mirror (in the case of a reflective telescope) or refracted by a focus lens (in the case of a refractive telescope) of said telescope, where the system comprises, in a manner known per se:
- first detecting means that comprise, as a minimum, an image acquisition device, such as a camera, and are envisaged to detect the optical aberrations that affect the primary focus of a telescope by means of the analysis of one or more images acquired by said image acquisition device; and
- an electronic system connected or integrating at least part of said first detecting means and connected at least to said element for receiving a primary beam, said electronic system being envisaged to calculate, based on the detected optical aberrations with the purpose of compensating them, first positional correction values to generate, based on the same, control signals to apply them to at least one actuating device of said element for receiving a primary beam, or on a mobile support thereof, with the purpose of moving it in a controlled manner.

Unlike conventional optical aberration compensation systems, the one proposed by the second aspect of the invention is applied to a telescope where said element for receiving a primary beam to be moved in a controlled manner is said image acquisition device, where said first detecting means are integrated in part to said electronic system and where said electronic system implements an algorithm without an image processing sensor to carry out said detection of aberrations by means of said analysis of said image or images acquired by said image acquisition device, to process the values of the detected optical aberrations and to generate said first positional correction values and said control signals.

According to an embodiment example of the system proposed by the second aspect of the invention, the sensorless algorithm implemented in the electronic system is a sensorless adaptive optics sensor, or SAO.

According to an embodiment example, the mobile support of the image acquisition device is mounted on a support and positioning structure arranged in the telescope and envisaged to displace the mobile support, and with it, the image acquisition device, according to at least the following movements:
- linear backward/forward movement along the direction of the longitudinal axis of the tube of the telescope, to compensate defocus aberrations;
- rotary movement with respect to both axes, perpendicular to one another and with respect to said longitudinal axis of the tube of the telescope, to compensate distortion and tilt aberrations; and
- lateral movement along a perpendicular plane of the longitudinal axis of the telescope, to compensate coma aberrations.

The system proposed by the second aspect of the invention is envisaged, according to an embodiment example, to implement the method proposed by the first aspect by carrying out steps a) and b) by means of the electronic system and the image acquisition device, and step c) by means of the electronic system in collaboration with said actuating means.

BRIEF DESCRIPTION OF THE DRAWINGS

The previous and other advantages and characteristics will be understood more fully based on the following detailed description of embodiment examples with reference to the attached drawings, which should be taken in an illustrative rather than limitative manner, wherein.

DETAILED DESCRIPTION

The attached figures illustrate part of a telescope, in particular the part constituted by a tube 5 constituting a portion of the total tube of the telescope, in which opposite end the primary beam is housed (not illustrated), in the case of a reflective-type telescope, or in the case of a refractive telescope, the focus lens (not illustrated) thereof.

In particular, in the case of a reflective telescope with a Serrurier open tube system, the tube 5 is the one mounted on a first extremity of the bars of the Serrurier open tube, which, in their opposite extremities, are affixed to a support of the primary mirror.

Figure 1:
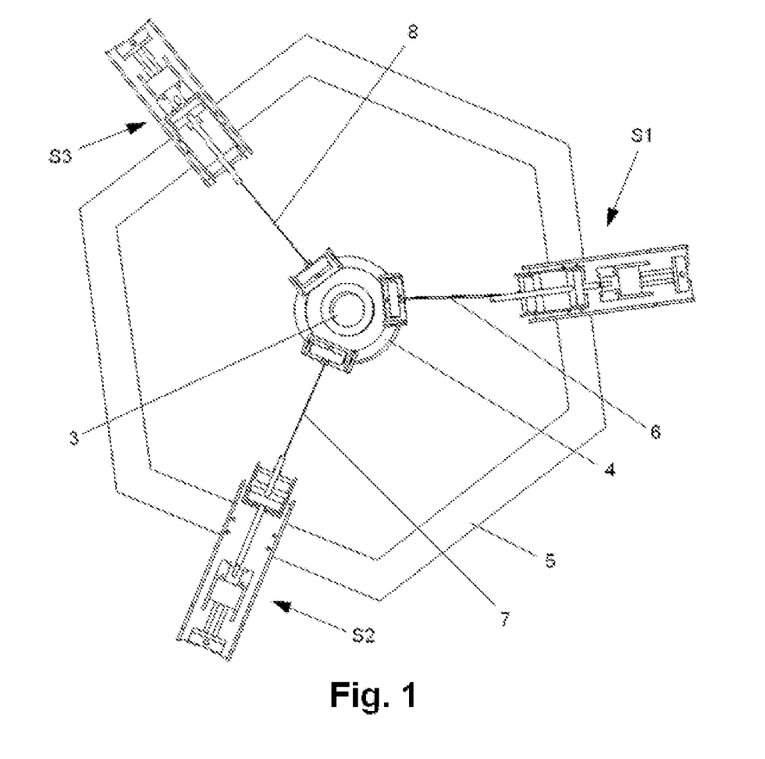
FIG. 1 is a plant view of the optical aberration compensation system proposed by the second aspect of the invention for an embodiment example for which it is mounted in the end part of a tube of a telescope, surrounding the primary focus.
Figure 2:
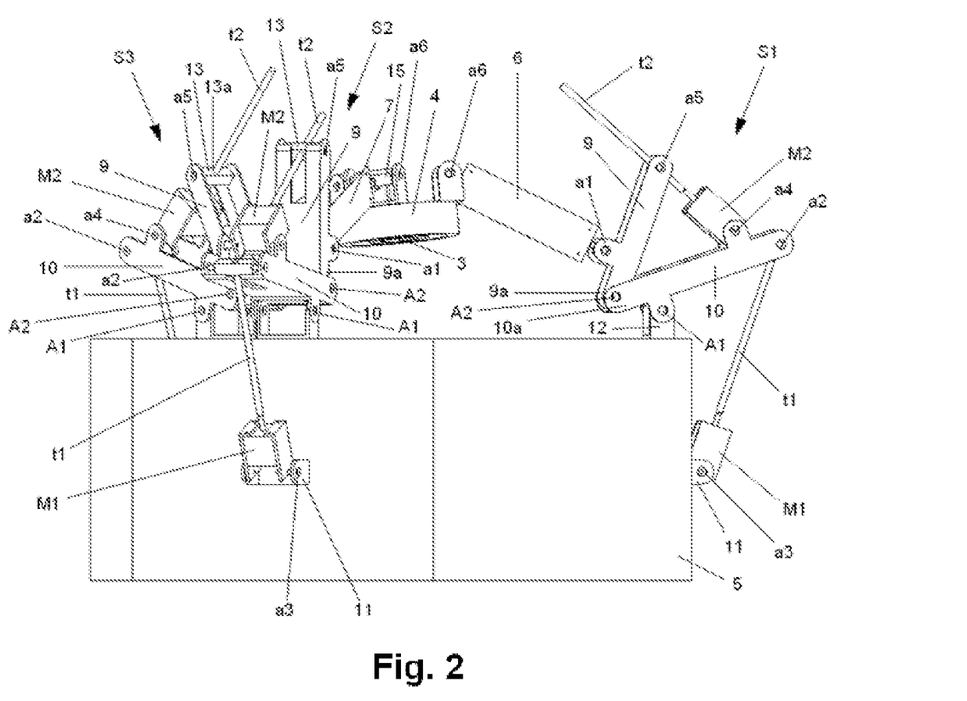
FIG. 2 shows the same elements as FIG. 1, but by means of an elevated view.
Figure 3:
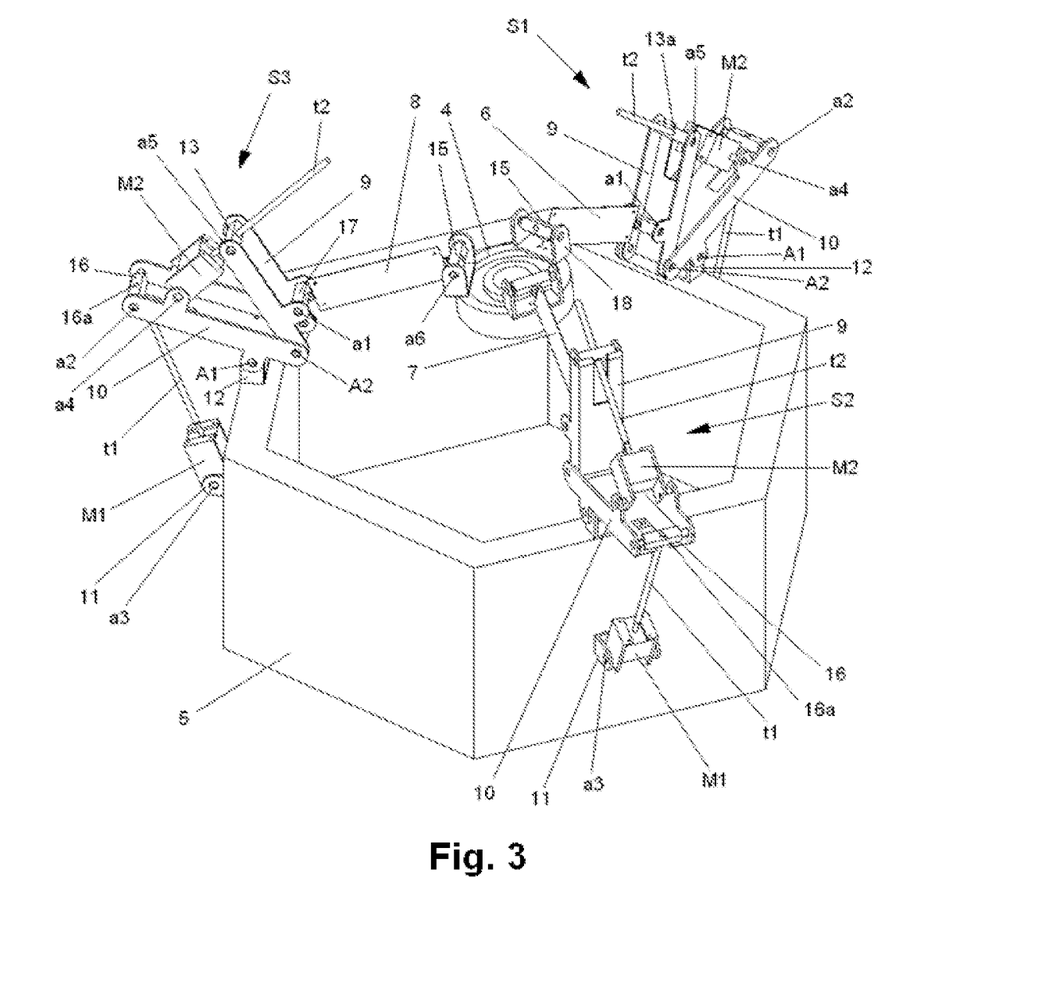
FIG. 3 is a perspective view of the optical aberration compensation system proposed by the second aspect of the invention, according to the mounting illustrated by FIGS. 1 and 2.

As indicated in a previous section, in the optical aberration compensation system proposed by the second aspect of the invention, the mobile support 4 of the image acquisition device 3 (see FIG. 2) or camera, is mounted on a support and positioning structure, which, for the embodiment example illustrated by FIGS. 1, 2 and 3, comprises three actuating mechanisms S1, S2 and S3 (for other embodiment examples, the number of mechanisms differs from the one illustrated) mounted in three respective points along the contour of tube 5 of the telescope, protruding outwards from the tube 5, each one of the, also connected to a respective point of the mobile support 4 through a respective connecting element 6, 7, 8, the electronic system (not illustrated) being envisaged to control said actuating mechanisms S1, S2, S3 by means of the generation and application of control signals to cause a combined actuation that moves the mobile support 4 to compensate the detected optical aberrations.

For the illustrated embodiment example, the connecting elements 6, 7, 8 are respective metal sheets arranged occupying respective planes that contain or are parallel to planes that contain the longitudinal axis of the tube of the telescope, with the purpose of minimizing the interference thereof in the path of the beam directed towards the primary mirror.

The camera 3 is directed downwards, according to the position illustrated by FIG. 2, facing the primary mirror (not illustrated) of the telescope, to receive the beam of light reflected therein, or, for another embodiment example where the telescope is a refractive-type telescope, towards the focus lens (not illustrated) thereof.

For the embodiment example for which the system proposed is applied to a reflective telescope, the view illustrated in FIG. 1 is an elevated view, for a zenith working position in the end part of the telescope, according to a primary focus configuration, where the camera 3 points downwards, according to FIG. 2, in the direction of the primary mirror arranged in the base thereof.

As specially shown in FIG. 1, said three points wherein the three actuating mechanisms S1, S2 and S3 are mounted, are separated from each other at an angular distance of substantially 120°.

Each one of the actuating mechanisms S1, S2, S3 is envisaged to move their respective connecting element 6, 7 8, and therefore the mobile support 4, along a respective plane that contains, or is parallel to a plane that contains, the longitudinal axis of the tube 5 of the telescope.

As seen in the attached figures, for the illustrated embodiment example, each one of the three actuating mechanisms S1, S2 and S3 comprises:
- a first arm 9 joined by an intermediate area to the connecting element 6, 7, 8, that is to say, the metal sheets 6, 7 8, and a second arm joined, by a first extremity 10a or by an area close to said extremity 10a, by means of a first articulation A1, to said point of the contour of tube 5 of the telescope, and also joined, by said first extremity 10a, to a first extremity 9a of said first arm 9 by means of a second articulation A2, and
- two motors M1-M2, each one of them connected cinematically to one of said first 9 and second 10 arms to move them, respectively, according to a rotary movement around said first A1 and second A2 articulations.

FIG. 3 in particular shows that for the illustrated embodiment example, each arm 9, 10 is formed by two equal elongated, parallel plates joined by a longitudinal edge by means of a third plate.

FIGS. 2 and 3 show that a piece 12 is affixed to each one of the points, angularly distanced in 120° from the contour of tube 5, which is articulated by means of articulation A1 to two ears of the two elongate plates of the second arm 10.

Likewise, each motor M1 is mounted, in an articulated manner, by means of the articulation a3, to a respective support piece 11 affixed to an external lateral wall of tube 5.

Each motor M2 is also mounted on the second arm 10, by means of an articulation a4 joined to other two ears of the two elongate plates of the second arm 10, as shown in FIG. 3.

In terms of the aforementioned cinematic connections of the motors M1-M2, they are constituted, for the illustrated embodiment example, by respective worm screws t1, t2, which are made to rotate by the motors M1-M2, which are rotary, by being screwed on or unscrewed from corresponding through holes 16a, 13a, with an internal thread, of pieces 16, 13, articulated by means of the articulations a2 and a5, respectively, to the extremities of the arms 10, 9 opposite said first extremities 10a, 9a, as shown in FIG. 3.

Another type of cinematic connections and motors other than the ones illustrated are also possible for other embodiment examples, such as using linear motors associated to cinematic connections formed by mobile pieces displaced in a guided manner on fixed pieces.

In terms of the union of the first arm 9 to the metal sheets 6, 7 8, it takes place, as shown in FIG. 3, by means of three respective pieces 17, each one of which is joined to a first extremity of a metal sheet 6, 7 8, and also, by means of an articulation a1, to two other ears of the elongate pieces of a respective first arm 9.

A second extremity of each one of the metal sheets 6, 7, 8 is affixed to a piece 15, which is in turn joined, by means of an articulation a6, to a piece 18 affixed to the mobile support 4.

The connecting elements, that is to say, the metal sheets 6, 7, 8, are arranged under tension, and in order avoid their distension when moved, the electronic system is envisaged to control the actuating mechanisms S1, S2, S3 by means of the application of the control signals in successive increments, in each one of the actuating mechanisms S1, S2, S3 to move the mobile support 4 from a compensation point to a neighboring point without loosening the connecting elements 6, 7, 8.

An expert in the art could introduce changes and modifications to the described embodiment examples without departing from the scope of the invention as defined in the attached claims.

The invention claimed is:

1. A method for compensating optical aberrations in a telescope, comprising carrying out the following steps in an automatic manner:
   a) detecting optical aberrations affecting primary focus, by analysis of at least one image acquired by the image acquisition device;
   b) calculating, based on said optical aberrations detected in a) to compensate for the aberrations detected, first positional correction values,
   c) moving, in a controlled manner, at least one element for receiving a primary beam after being reflected by a primary mirror or refracted by a focus lens of said telescope, by application of suitable control signals generated from said first positional correction values;
   the method being applied to a telescope wherein said element for receiving a primary beam to be moved in c) is said image acquisition device, and comprising using an algorithm to carry out said step a), by said analysis of at least one image acquired by said image acquisition device, and to carry out said step b), by processing of the values of the detected optical aberrations and the generation of said first positional correction values as a result of said processing;
   using said algorithm by adjusting width of a frequency spectrum to be analyzed and processed to limit effects related to shadows due to obstructions appearing in the image or images, caused by interposition of said image acquisition device and/or any other element, between incident light and the primary mirror.

2. The method according to claim 1, wherein said algorithm is an adaptive optics algorithm.

3. The method according to claim 1 further comprising carrying out a calibration process including carrying out a plurality of said step a) for a corresponding plurality of positions of said telescope, correlating data of the detected optical aberrations with data of the positions of the telescope for which they have been detected, and recording said correlations in an aberration correction registry.

4. The method according to claim 3, wherein said calibration process also comprises carrying out a plurality of said steps b) for said plurality of positions of the telescope and correlating the data of the first positional correction values calculated with the data relative to the detected optical aberrations and with the data of the corresponding positions of the telescope, and including said data of the first positional correction values in said aberration correction registry.

5. The method according to claim 3, further comprising orienting the telescope towards determined coordinates, consulting said aberration correction registry to look for the data of the position of the telescope after being oriented in this manner and the correlated data of the detected optical aberrations, and moving, in step c), the image acquisition device depending on the optical aberration data obtained as a result of said consultation of said aberration correction registry.

6. The method according to claim 4, further comprising orienting the telescope towards determined coordinates, consulting said aberration correction registry to look for the data of the position of the telescope after being oriented and the correlated data of the first positional correction values and moving, in step c), the image acquisition device depending on the first positional correction values extracted from said aberration correction registry.

7. The method according to claim 5 further comprising with the purpose of determining said orientation of the telescope towards said determined coordinates, correcting positioning errors with respect to a mounting system, detecting at least values of said positioning errors, directly and/or indirectly, and using a pointing algorithm to process said values, and supplying, as a result of said processing, second positional correction values.

8. The method according to claim 7 further comprising carrying out said correction of positioning errors, also detecting values of one or more non-positional parameters that have an influence on generation of said positioning errors, and using said pointing algorithm to also process said values of said non-positional parameters.

9. The method according to claim 8, further comprising carrying out a training system including detecting values of said positioning errors for a plurality of positions of the telescope regarding the mounting system, in detecting and/or calculating values of said non-positional parameters for at least each one of said plurality of positions of the telescope and/or for different working temperatures to which the telescope is submitted, and in using said pointing algorithm to process all of said values, to supply and correlate the corresponding second positional correction values with the values of the positioning errors and non-positional parameters, and to record said correlations in a pointing registry.

10. The method according to claim 8 wherein among said non-positional parameter or parameters that have an influence on the generation of said positioning errors, the method comprises supplying the values of the non-positional parameter or parameters that also have an influence on the optical system of the telescope, to said algorithm, and processing the values of the non-positional parameter or parameters by said algorithm, together with the values of the detected optical aberrations in order to calculate, in step b), said first positional correction values.

11. The method according to claim 1, wherein said step b) also comprises calculating, based on at least said optical aberrations detected in a), with the purpose of compensating for said optional aberrations detected in a), third positional correction values for an element for receiving a beam reflected by a secondary mirror of the telescope, and wherein said step c) also comprises moving said elements for receiving said beam reflected by said secondary mirror by application of suitable signals generated based on said third positional correction values.

12. The method according to claim 1, wherein said frequency spectrum to be analyzed and processed by the algorithm is between 0.5 and 20% of a total frequency spectrum of the acquired images.

13. The method according claim 1, wherein said at least one of the aberrations to be compensated belong to the group consisting of the following low-order optical aberrations: defocus, distortion, tilt, coma, or a combination thereof.

14. A system configured to implement the method of claim 1, carrying out said steps a) and b) by the electronic system and the image acquisition device, and said step c) by the electronic device in collaboration with actuation means.

15. A method for compensating optical aberrations in a telescope, comprising carrying out the following steps in an automatic manner: a) detecting optical aberrations affecting primary focus, by analysis of at least one image acquired by the image acquisition device; b) calculating, based on said optical aberrations detected in a) to compensate for the aberrations detected, first positional correction values, c) moving, in a controlled manner, at least one element for receiving a primary beam after being reflected by a primary mirror or refracted by a focus lens of said telescope, by application of suitable control signals generated from said first positional correction values, the method being applied to a telescope wherein said element for receiving a primary beam to be moved in c) is said image acquisition device, and comprising using an algorithm to carry out said step a), by said analysis of at least one image acquired by said image acquisition device, and to carry out said step b), by processing of the values of the detected optical aberrations and the generation of said first positional correction values as a result of said processing;

carrying out a calibration process including carrying out a plurality of said step a) for a corresponding plurality of positions of said telescope, correlating data of the detected optical aberrations with data of the positions of the telescope for which they have been detected, and recording said correlations in an aberration correction registry;

orienting the telescope towards determined coordinates, consulting said aberration correction registry to look for the data of the position of the telescope after being oriented in this manner and the correlated data of the detected optical aberrations, and moving, in step c), the image acquisition device depending on the optical aberration data obtained as a result of said consultation of said aberration correction registry;

correcting positioning errors with respect to a mounting system, detecting at least values of said positioning errors, directly and/or indirectly, and using a pointing algorithm to process said values, and supplying, as a result of said processing, second positional correction values;

carrying out said correction of positioning errors, also detecting values of one or more non-positional parameters that have an influence on generation of said positioning errors, and using said pointing algorithm to also process said values of said non-positional parameters;

wherein among said non-positional parameter or parameters that have an influence on the generation of said positioning errors, the method comprises supplying the values of the non-positional parameter or parameters that also have an influence on the optical system of the telescope, to said algorithm, and processing the values of the non-positional parameter or parameters by said algorithm, together with the values of the detected optical aberrations in order to calculate, in step b), said first positional correction values; and wherein said calibration process also comprises at least detecting and/or calculating the values of said non-positional parameters for at least each one of said plurality of positions of the telescope and/or for different working temperatures to which the telescope is submitted, and including said detected values in said aberration correction registry, as well as using said detected values for the calculation, in said plurality of steps b), of said data of the first positional correction values and including the first positional correction values in the aberration correction registry, also correlated with the detected and/or calculated values of said non-positional parameters.

16. The method according to claim 15, further comprising orienting the telescope towards determined coordinates, consulting said aberration correction registry to look for the data of the telescope position after being oriented, the values of said detected and/or calculated non-positional parameters, and the correlated data of the first positional correction values, and moving, in step c), the image acquisition device according to the data of the first correctional position values consulted in said aberration correction registry.

17. The method according to claim 16 further comprising with the purpose of obtaining, with respect to a region in space located in determined coordinates, images that are substantially free from influence of optical aberrations and positioning errors, carrying out the following actions: —detecting, for the position of the telescope with respect to mounting system, corresponding to said coordinates, the values of the positioning errors and working temperature and detecting and/or calculating the values of said non-positional parameters corresponding to said position and working temperature; —consulting the detected values of the positioning errors and the detected and/or calculated values of the non-positional parameters in said pointing registry, obtaining the correlated second positional correction values and using the correlated second positional correction values to orient the telescope towards said coordinates in a precise manner; consulting said aberration correction registry to look for the first positional correction values correlated with the data of the position of the telescope corresponding to said coordinates and to the values of said detected and/or calculated values of said non-positional parameters; and—moving, in step c), the image acquisition device according to the data of the first positional correction values obtained in said consultation of the aberration correction registry.

18. A method for compensating optical aberrations in a telescope, comprising carrying out the following steps in an automatic manner: a) detecting optical aberrations affecting primary focus, by analysis of at least one image acquired by the image acquisition device; b) calculating, based on said optical aberrations detected in a) to compensate for the aberrations detected, first positional correction values, c) moving, in a controlled manner, at least one element for receiving a primary beam after being reflected by a primary mirror or refracted by a focus lens of said telescope, by application of suitable control signals generated from said first positional correction values, the method being applied to a telescope wherein said element for receiving a primary beam to be moved in c) is said image acquisition device, and comprising using an algorithm to carry out said step a), by said analysis of at least one image acquired by said image acquisition device, and to carry out said step b), by processing of the values of the detected optical aberrations and the generation of said first positional correction values as a result of said processing;

carrying out a calibration process including carrying out a plurality of said step a) for a corresponding plurality of positions of said telescope, correlating data of the detected optical aberrations with data of the positions of the telescope for which they have been detected, and recording said correlations in an aberration correction registry;

orienting the telescope towards determined coordinates, consulting said aberration correction registry to look for the data of the position of the telescope after being oriented in this manner and the correlated data of the detected optical aberrations, and moving, in step c), the image acquisition device depending on the optical aberration data obtained as a result of said consultation of said aberration correction registry;

correcting positioning errors with respect to a mounting system, detecting at least values of said positioning errors, directly and/or indirectly, and using a pointing algorithm to process said values, and supplying, as a result of said processing, second positional correction values;

carrying out said correction of positioning errors, also detecting values of one or more non-positional parameters that have an influence on generation of said positioning errors, and using said pointing algorithm to also process said values of said non-positional parameters;

wherein one or more of said non-positional parameters belong to the group consisting of the following non-positional parameters: expansion coefficients due to temperature, flexure of the support of a mirror, flexure of a support of an image capture device, flexure of the tube of the telescope, flexure of the mounting system or mount of the telescope, or a combination thereof, and because said positioning errors refer to at least one of the following positional parameters related to the mounting system of the telescope: delta displacement parameter and alpha displacement parameter of the reference of each axis, delta non-perpendicularity parameter and alpha non-perpendicularity parameter of the axes, horizontal alignment error parameter and vertical alignment error parameter to the pole, for an equatorial mounting system or mount, or to the zenith point, for an alt-azimuth mounting system or mount, or a combination thereof.

19. The method according to claim 1, further comprising moving said image acquisition device by moving a mobile support thereof according to different degrees of freedom.

20. System for compensating optical aberrations in a telescope, said telescope comprising at least one element for receiving a primary beam after being reflected by a primary mirror or refracted by a focus lens of said telescope, the system comprising: —first detecting means that comprise an image acquisition device, to detect the optical aberrations that affect primary focus of a telescope by analysis of one or more images acquired by said image acquisition device; and an electronic system connected or integrating at least part of said first detecting means and connected at least to said element for receiving a primary beam, said electronic system being configured to calculate, based on the detected optical aberrations with the purpose of compensating for the detected optical aberrations first positional correction values to generate, based on the first correction values, control signals to apply the first positional correction values to at least one actuating device of said element for receiving a primary beam, or to apply the first positional correction values on a mobile support thereof for moving the mobile support in a controlled manner; wherein the system is applied to a telescope wherein said element for receiving a primary beam to be moved in a controlled manner is said image acquisition device wherein said first detecting means are integrated in part to said electronic system, and wherein said electronic system implements an algorithm to carry out said detection of aberrations by said analysis of said image or images acquired by said image acquisition device, to process the values of the detected optical aberrations and to generate said first positional correction values and said control signals;

wherein said mobile support of the image acquisition device is mounted on a support and positioning structure arranged in the telescope and provided to displace the mobile support, and with the mobile support the image acquisition device according to at least the following movements: —linear backward/forward movement along the direction of the longitudinal axis of the tube of the telescope, to compensate defocus aberrations; —rotary movement with respect to both axes, perpendicular to one another and with respect to said longitudinal axis of the tube of the telescope, to compensate distortion and tilt aberrations; and—lateral movement along a perpendicular plane of the longitudinal axis of the telescope, to compensate coma aberrations.

21. The system according to claim 20, wherein said algorithm implemented in said electronic system comprises an adaptive optics sensor.

22. The system according to claim 20, wherein said support and positioning structure comprises at least three actuating mechanisms mounted in three respective points along a contour of the tube of the telescope, protruding outwards from a tube, each one of which also being connected to a respective point of the mobile support by a respective connecting element, the electronic system being configured to control said actuating mechanisms, which are at least three, by generation and application of said control signals to provoke a combined actuation that moves the mobile support to compensate the detected optical aberrations.

23. The system according to claim 22, wherein said three points are separated from each other at an angular distance of substantially 120°.

24. The system according to claim 22 wherein each one of the actuating mechanisms, which are at least three, is configured to move a respective connecting element and therefore the mobile support, along a respective plane that contains, or is parallel to a plane that contains, the longitudinal axis of the tube of the telescope.

25. The system according to claim 24, wherein each one of the actuating mechanisms, which are at least three, comprise: —at least one first arm joined by an intermediate area to said connecting element and a second arm joined, by a first extremity or by an area close to said first extremity, by a first articulation, to said point of the contour of tube of the telescope, and also joined, by said first extremity, to a first extremity of said first arm by a second articulation, and—at least two motors, each one of the mothers connected to one of said first and second arms to move the first and second arms, respectively, according to a rotary movement around said first and second articulations.

26. The system according to claim 22, wherein said connecting elements are respective metal sheets arranged occupying respective planes that contain, or are parallel to planes that contain, the longitudinal axis of the tube of the telescope, with the purpose of minimizing the interference thereof in a path of a beam directed towards the primary mirror.

27. The system according to claim 22, wherein said connecting elements are arranged under tension, and wherein the electronic system is configured to control the actuating mechanisms, which are at least three, by application of said control signals in successive increments, in each one of the actuating mechanisms to displace the mobile support from a compensation point to a neighboring point without loosening the connecting elements.

\* \* \* \* \*